United States Patent
Rao et al.

(10) Patent No.: US 6,914,885 B2
(45) Date of Patent: Jul. 5, 2005

(54) METHODS, WIRELESS RADIO RECEIVERS, AND SYSTEMS FOR SELECTING A DATA STREAM FROM CONCURRENTLY DEMODULATED RADIO SIGNALS

(75) Inventors: Prasada Rao, Durham, NC (US);
Robert A. Zak, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 792 days.

(21) Appl. No.: 09/850,248

(22) Filed: May 7, 2001

(65) Prior Publication Data

US 2002/0163904 A1 Nov. 7, 2002

(51) Int. Cl.[7] .......................... G01R 31/08; H04B 17/00
(52) U.S. Cl. ...................................... 370/252; 455/67.1
(58) Field of Search .............................. 455/8–10, 63, 455/67.4, 67.5, 67.6, 67.7, 504, 500, 67.1, 67.3; 702/66, 69; 370/252, 310, 328–334, 337, 347, 442, 458, 474, 503

(56) References Cited

U.S. PATENT DOCUMENTS 5,283,531 A * 2/1994 Serizawa et al. ........... 329/316
6,084,926 A     7/2000 Zak et al. ................... 375/341
6,151,487 A * 11/2000 Kim et al. .................. 455/134
6,754,252 B1 * 6/2004 Aldaz ......................... 375/148

OTHER PUBLICATIONS

U.S. Appl. No. 09/201,651; filed Nov. 30, 1998; Entitled: *Systems and Methods for Receiving a Modulated Signal Containing Encoded and Unencoded Bits Using Multi–Pass Demodulaion.*

* cited by examiner

*Primary Examiner*—David Vincent
(74) *Attorney, Agent, or Firm*—Myers Bigel Sibley & Sajovec, P.A.

(57) ABSTRACT

A demodulated data stream is selected by concurrently demodulating radio signals to provide a first data stream and a second data stream with the first data stream. A first error level associated with the first data stream is determined. A second error level associated with the second data stream is also determined. The data stream having the better error level can be selected for further processing. Related wireless radio receivers are also disclosed.

38 Claims, 4 Drawing Sheets

METHODS, WIRELESS RADIO RECEIVERS, AND SYSTEMS FOR SELECTING A DATA STREAM FROM CONCURRENTLY DEMODULATED RADIO SIGNALS

FIELD OF THE INVENTION

The present invention relates to receiving radio signals in general and, more particularly, to demodulating radio signals.

BACKGROUND

It is known to use two demodulators in radio receivers where one of the demodulators is used for high fading conditions (a "high fade" demodulator) and the other demodulator is used for low fading conditions (a "low fade" demodulator). Some conventional radio receivers may operate the "high fade" and the "low fade" demodulators serially to determine which of the demodulators should be used to receive radio signals based on errors detected using the respective demodulators. For example, some conventional radio receivers may first receive the radio signals using the "high fade" demodulator. If the data stream provided by the "high fade" demodulator passes a Cyclic Redundancy Code (CRC) check, the "high fade" demodulator may be used to receive the radio signals and the data stream provided by the "low fade" demodulator may not be checked. On the other hand, if the data stream provided by the "high fade" demodulator fails the CRC check, the "low fade" demodulator may be used to receive the radio signals.

SUMMARY OF THE INVENTION

Embodiments according to the present invention can provide methods, wireless radio receivers, and systems for selecting concurrently demodulated data streams. Pursuant to these embodiments, radio signals can be concurrently demodulated to provide first and second data streams. A first error level associated with the first data stream can be determined that indicates the acceptability of the first data stream for further processing. A second error level associated with the second data stream can also be determined that indicates the acceptability of the second data stream for further processing.

DETAILED DESCRIPTION OF THE INVENTION

Figure 1:
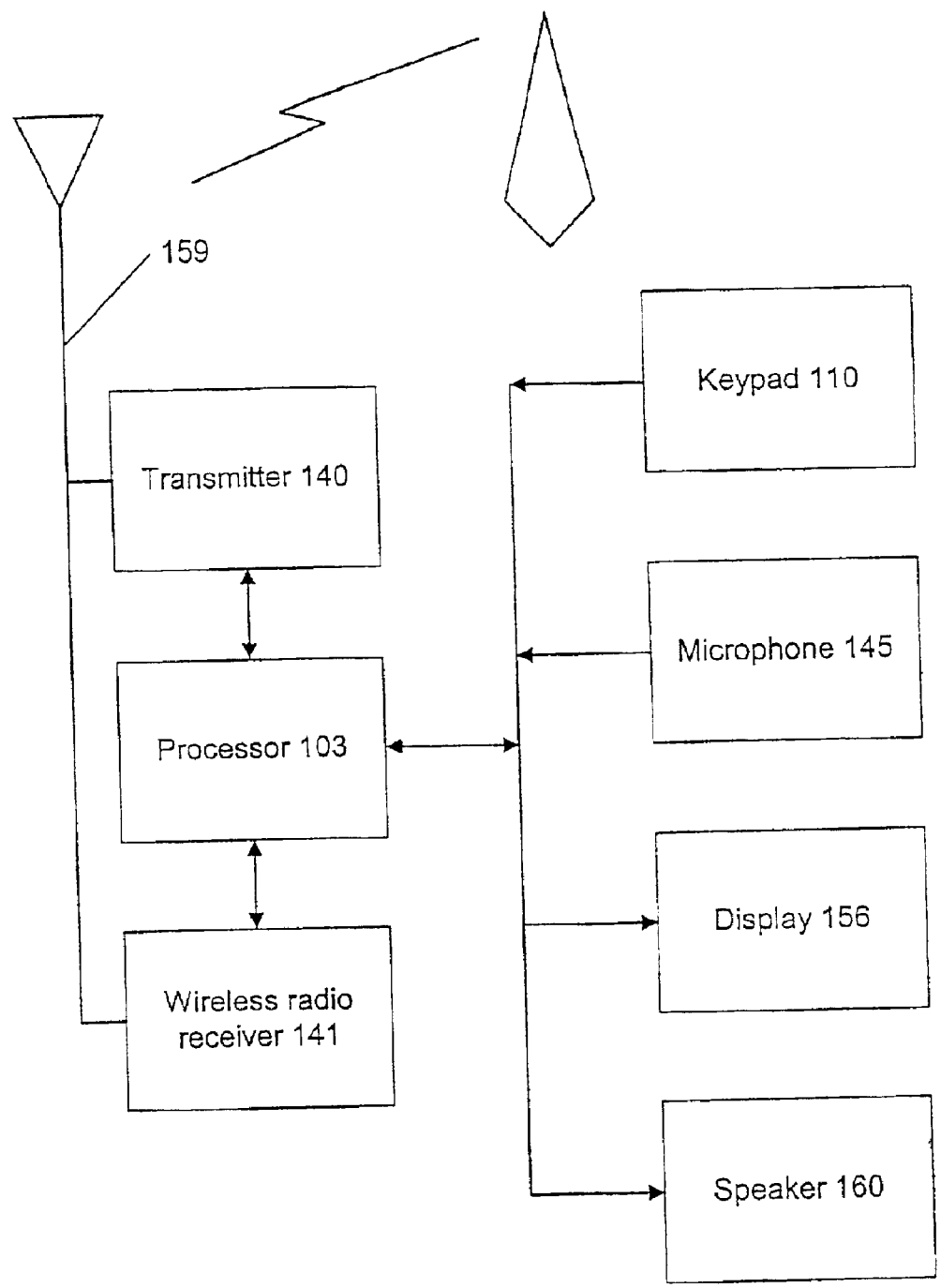
FIG. 1 is a block diagram that illustrates embodiments of radiotelephones according to the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one skilled in the art, the present invention may be embodied as methods or devices, such as wireless radio receivers. Accordingly, the present invention may take the form of hardware embodiments, software embodiments or embodiments that combine software and hardware aspects.

The present invention is also described using flowchart illustrations and block diagrams. It will be understood that each block (of the flowchart illustrations and block diagrams), and combinations of blocks, can be implemented by computer program instructions. These program instructions may be provided to a processor(s) within the wireless radio receiver, such that the instructions which execute on the processor(s) create means for implementing the functions specified in the block or blocks. The computer program instructions may be executed by the processor(s) to cause a series of operational steps to be performed by the processor(s) to produce a computer implemented process such that the instructions which execute on the processor(s) provide steps for implementing the functions specified in the block or blocks.

Accordingly, the blocks support combinations of means for performing the specified functions, combinations of steps for performing the specified functions and program instruction means for performing the specified functions. It will also be understood that each block, and combinations of blocks, can be implemented by special purpose hardware-based systems which perform the specified functions or steps, or combinations of special purpose hardware and computer instructions.

Embodiments of the present invention are described herein by reference to wireless radio receivers in radiotelephones. It will be understood that wireless radio receivers according to the present invention can be used in any electronic device that receives radio signals. For example, embodiments of wireless radio receivers according to the present invention can be used in base stations in cellular telephone systems, in satellite systems, in computers, in personal digital assistants, such as "palm" devices, that can wirelessly connect to networks, such as a Public Switched Telephone Network, and the like. The present invention may also be used with digital or analog radio signals. Furthermore, the present invention may be used to receive radio signals over what are commonly referred to as "control" channels or "traffic" channels in a wireless communications system. As will be understood by those of ordinary skill in the art, a channel can be defined by a frequency (FDMA), a frequency and a time slot (TDMA), or other techniques known in the art.

FIG. 1 is a block diagram that illustrates embodiments of radiotelephones 101 including wireless radio receivers 141 according to the present invention. The radiotelephone 101 can be used to communicate with a wireless communications system 102 using radio signals.

Wireless communications systems 102 are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems, such as those conforming to the North American standard IS-54 and the European standard GSM, have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data).

The radiotelephone 101 can include a keypad 110 which can be used to provide input to the radiotelephone 101. The keypad 110 can include a plurality of keys that provide input to the radiotelephone 101 when pushed. For example, when the user wishes to initiate a call in the wireless communications system 102, the user can push a series of keys that correspond to the number to be dialed. During the call, the user can speak into a microphone 145 which can cause the radiotelephone 101 to transmit radio signals that encode the user's speech. The user may also listen to a speaker 160 that produces audio signals generated by the radiotelephone 101 based on the received radio signals.

The user may refer to a display 156 to observe information relevant to the operation of the radiotelephone 101, such as characters, numbers, or symbols that are entered by the user via the keypad 110. For example, the display 156 can be a black and white Liquid Crystal Display (LCD). The numbers, characters, or symbols can be generated for display by a character generator which is not shown. For example, the character generator can generate numbers for display when the user enters a telephone number on the keypad 110. The keypad 110, the microphone 145, the speaker 160, and the display 156 can be coupled to a processor 103 which can control operations of the radiotelephone 101.

The radiotelephone 101 can transmit radio signals to the wireless communications system via a transmitter 140 and an antenna 159 based on data provided by the processor 103. For example, the processor 103 can provide data to the transmitter 140 when the user speaks into the microphone 145.

The radiotelephone 101 can receive the radio signals from the wireless communications system 102 using the wireless radio receiver 141. For example, during a call, the radiotelephone 101 may receive radio signals from the wireless communications system 102 via the wireless radio receiver 141 which may be provided to the processor 103 and reproduced as audio signals through the speaker 160.

Figure 2:
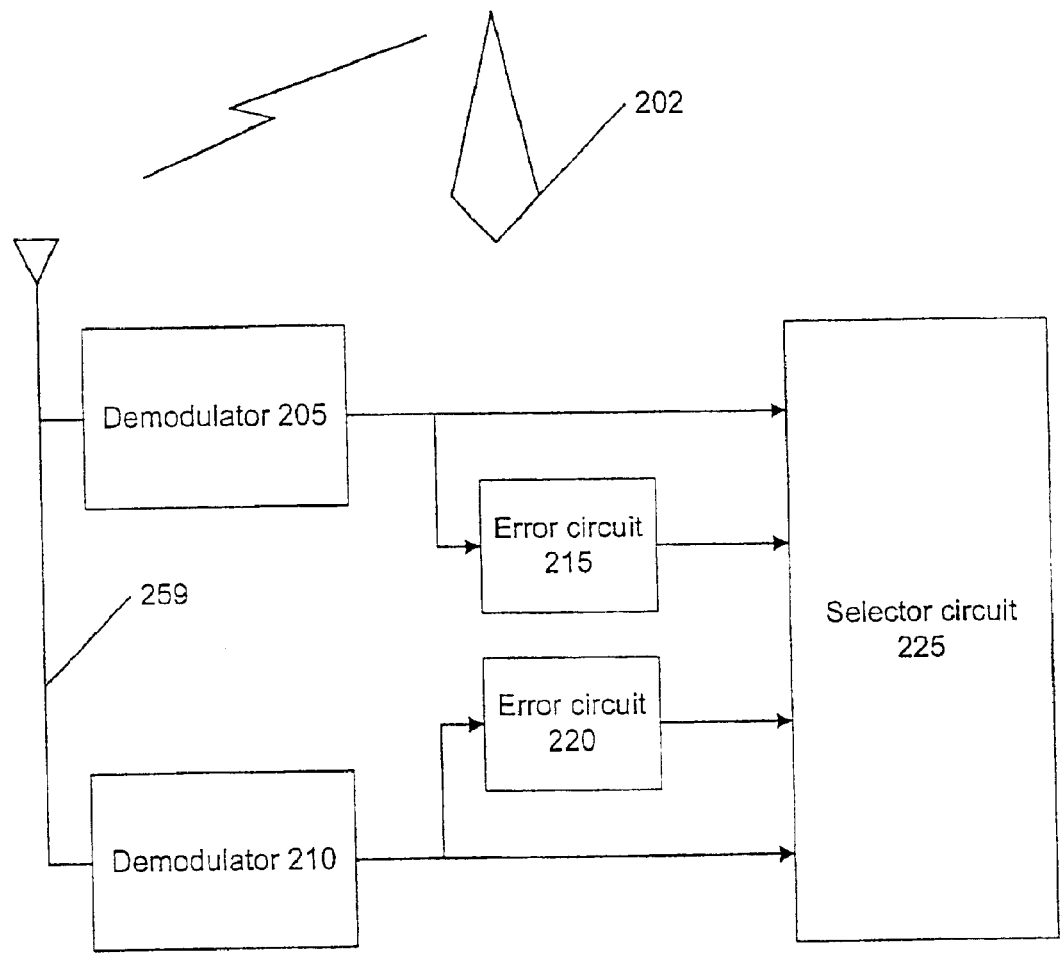
FIG. 2 is a block diagram that illustrates embodiments of wireless radio receivers, methods, and systems according to the present invention.

FIG. 2 is a block diagram that illustrates embodiments of wireless radio receivers 200 according to the present invention. The wireless radio receiver 200 can include a first demodulator 205 that provides a first demodulated data stream based on the radio signals received by the wireless radio receiver 200. The wireless radio receiver 200 can also include a second demodulator 210 that demodulates the radio signals concurrently with the first demodulator 205 to provide a second demodulated data stream based on the radio signals received by the wireless radio receiver 200. For example, the first and second demodulators 205, 210 can operate in parallel to concurrently demodulate the radio signals to provide the first and second data streams.

The first and second data streams can be organized as frames of data in a Time Division Multiple Access (TDMA) wireless communications system, such as in the air interface standard commonly known as IS 136. It will be understood that the present invention may be used in other types of wireless communications systems.

As used herein, the term "concurrently" includes embodiments where the first and second demodulators demodulate the radio signal radio signals received via the antenna during times which overlap. For example, the first and second demodulators can each demodulate the same radio signals to provide the respective data streams. Furthermore, the input to one of the demodulators can be buffered so that the radio signals reach that demodulator at a different time than the radio signals reach the other demodulator. It will be understood that both demodulators may have associated input buffers that provide different delays.

It will also be understood that the first and second data streams can also be provided concurrently so that at least a portion of the first and second data streams overlap in time. For example, in some embodiments according to the present invention, an end portion of the first data stream overlaps in time with a starting portion of the second data stream. In other embodiments according to the present invention, at least a portion of two frames in different data streams that correspond to the same radio signals overlap in time. In still other embodiments according to the present invention, frames that include data that corresponds to the same radio signals are provided at about the same time so that the frames are substantially aligned in time. It will be further understood that one or both of the data streams can be buffered and still provided concurrently. For example, one of the demodulators may include a buffer that stores at least a portion of the respective datastream. Therefore, the respective data stream may be provided by the demodulator so that it is shifted relative to the other data stream. In such embodiments according to the present invention, the data streams are provided "concurrently" within the meaning defined herein.

The first demodulator 205 can be a differential demodulator that is adapted to demodulate radio signals including those that are characterized by "low" or static fading effects which can remain fairly constant, for example, when wireless radio receiver is stationary or is moving slowly, such as when the wireless radio receiver is receiving radio signals while a user is walking. Other types of demodulators can also be used as the first demodulator 205.

The second demodulator 210 can be adapted to demodulate radio signals that are characterized by "high" or time dispersive fading effects which may change rapidly over time, for example, when the wireless radio receiver is moving quickly, such as when the wireless radio receiver is being used in a car that is travelling at highway speeds. For example, the second demodulator 210 can be a Maximum Likelihood Sequence Estimation (MLSE) equalizer. Other types of demodulators can be used as the second demodulator 210.

It will be understood that wireless radio receivers 200 according to the present invention can include more than two demodulators. For example, in some embodiments according to the present invention, N demodulators may be used wherein each of the N demodulators is adapted to receive radio signals that are characterized by one of N effects. It will be understood that the demodulators can be in a single device, such as an integrated circuit or distributed among several devices.

The performance of the each of the demodulators may degrade in situations where the radio signals are characterized by a type of fading other than what the demodulator is adapted to receive. For example, the performance of the first demodulator 205 can degrade when the radio signals are characterized by "high" fading effects. The performance of the second demodulator 210 may degrade when the radio signals are characterized by "low" fading effects.

The performance of the first and second demodulators 205, 210 can be determined by reference to first and second error levels provided by first and second error circuits 215, 220. The first and second error circuits 215, 220 can be electrically coupled to the first and second demodulators 205, 210 respectively and can provide the first and second error levels associated with the first and second data streams. In some embodiments according to the present invention, the first and second error circuits 215, 220 are first and second Cyclic Redundancy Code (CRC) checking circuits that provide the first and second error levels for frames of data included in the respective data streams. The first and second error levels can indicate whether the associated data stream includes an acceptable or unacceptable number of bits in error.

The error levels associated with each of the data streams can be checked to determine which of the first and second demodulators may provide better error performance under current conditions. In contrast, some conventional radio receivers can receive radio signals using one demodulator and determine whether to use that demodulator without determining the performance of the other demodulator.

The first and second error levels can be provided to a selection circuit 225. The selection circuit 225 can select the first or second data stream for further processing, such as conversion to audio signals, based on the first and second error levels. In some embodiments according to the present invention, if the first error level is determined to be acceptable and the second error level is determined to be unacceptable, the first demodulator 205 can be used to receive the radio signals. If the first error level is determined to be unacceptable and the second error level is determined to be acceptable, the second demodulator 210 can be used to receive the radio signals. The first and second error levels can be affected by the high and low fading effects discussed herein.

The selection circuit 225 can select the demodulator that provides the data stream having the lower error level even if the error levels indicate that either demodulator is currently providing data streams having acceptable error levels. For example, if the first and second error levels are both acceptable, the selection circuit 225 can select the first demodulator 205 if the first error level is lower than the second error level.

Furthermore, the selection circuit 225 can select the demodulator that provides the better data stream even if the first and second error levels are acceptable and are about equal. The selection circuit 225 can select the demodulator based on a historical error level data associated with first and second demodulators 205, 210. In some embodiments according to the present invention, the selection circuit 225 can select the demodulator that most recently provided the data stream with the lower error level. For example, if both demodulators are providing respective data streams having acceptable and about equal error levels for the current frames, the selection circuit 225 can select the demodulator which provided the lower error level for the previous frame. Accordingly, the data stream that is selected by the selection circuit 225 can be the data stream that was selected during the previous frame. Other techniques can be used to determine the better error level including statistical analysis of previous error levels.

The acceptable/unacceptable error levels can be determined based on the number of bits in error that may be acceptable for reproduction of audio signals by the radiotelephone 101. For example, in some embodiments according to the present invention, a frame of data having fewer than 6 bits in error may be acceptable for speech reproduction and datastreams having 6 or more bits in error may be unacceptable for speech reproduction. Accordingly, if the first demodulator 205 provides a frame of data having 6 bits in error and the second demodulator 210 provides a frame of data having 5 bits is error, the selection circuit 225 can select the second demodulator 210 to receive the radio signals and provide the datastream for the radiotelephone. It will be understood that different error levels may be acceptable or unacceptable in applications other than voice reproduction.

In embodiments according to the present invention that use, for example, the IS-136 standard, the first and second demodulators 205, 210 can provide datastreams organized as a series of frames that can each include data bits that represent audio information received from the wireless communications system. The data bits can fall into 3 classes: Class 1A bits, Class 1B bits, and Class 2 bits. In such embodiments, the Class 1A bits may be the only data bits in the frame that are protected by from errors by CRC check bits. IS-136 data frames can also include 65 Class 1B data bits and 82 Class 2 data bits neither of which are protected by CRC check bits. It will be understood that the Class 1B data bits can be convolutionally encoded.

Accordingly, the first and second error levels may indicate the error levels of the Class 1A bits in each of the data streams, but not the error levels in the Class 1B and Class 2 bits.

CRC is well understood in the art and need not be described further herein. Furthermore, it will be understood that other types of error detection may be used to provide the first and second error levels.

Figure 3:
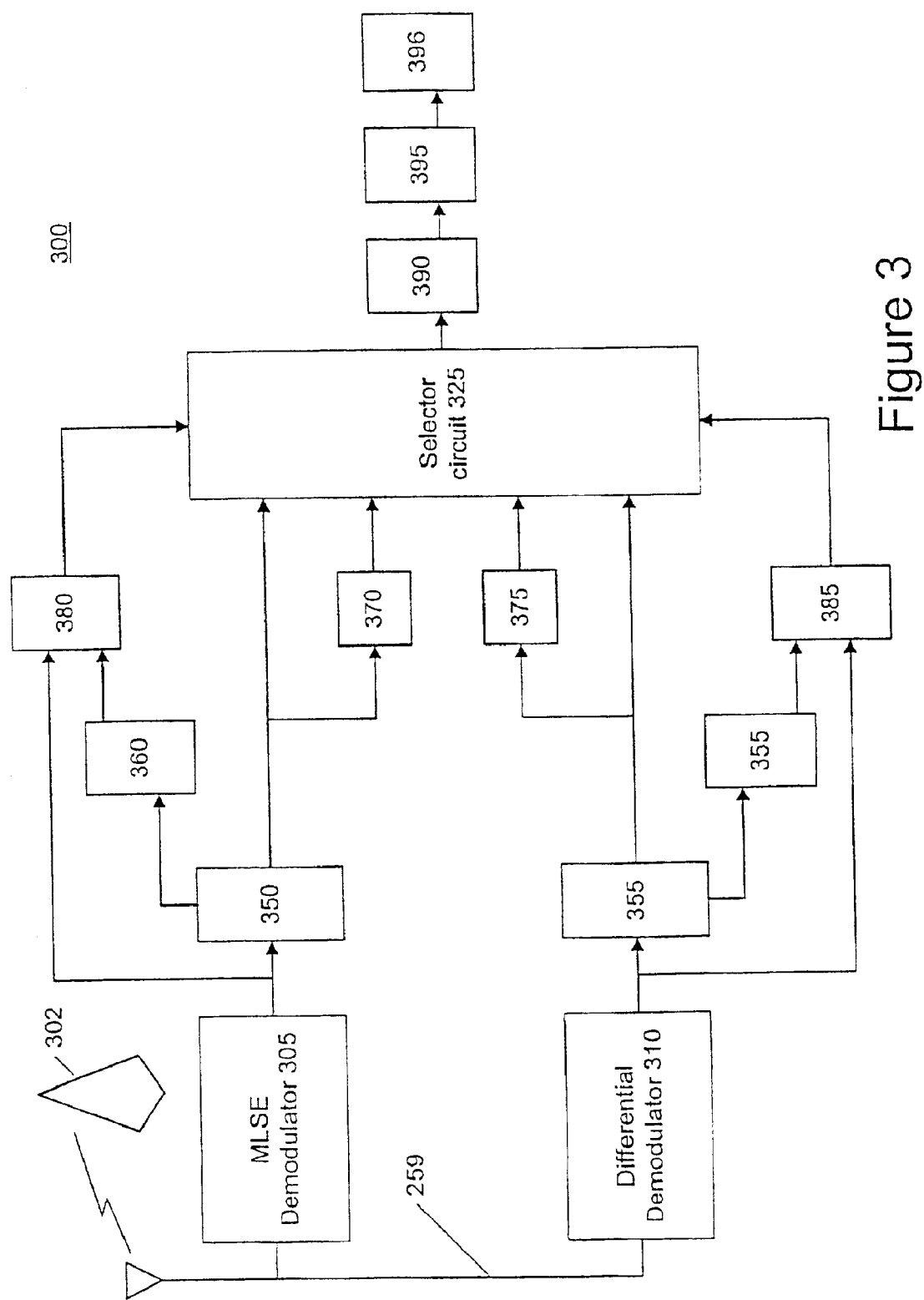
FIG. 3 is a block diagram that illustrates embodiments of wireless radio receivers, methods, and systems according to the present invention.

FIG. 3 is a block diagram that illustrates embodiments and methods of operating wireless radio receivers 300 according to the present invention. First and second demodulators 305, 310 can receive radio signals from a wireless communications system 320 via an antenna 359. The first demodulator 305 can be used to provide a first data stream 340 based on the received radio signals. The second demodulator 310 can be used to provide a second data stream 345 based on the received radio signals. Accordingly, the first and second demodulators demodulate the radio signals concurrently to provide first and second data streams 340, 345 to a selection circuit 325.

The first demodulator 305 is an MLSE demodulator that provides a first raw data stream. The second demodulator 310 is a differential demodulator that provides a second raw data stream. Other types of demodulators can be used.

The data included in the first and second raw data streams can be organized as frames of data according to, for example, the IS 136 standard. According to IS 136, the data bits in the raw data streams are interleaved so that data bits that are closely spaced in time during the reproduction of speech tend to be separated during transmission of data to reduce the likelihood that noise affecting the transmitted data will introduce artifacts into the reproduced audio. Accordingly, the first and second raw data streams are provided to first and second deinterleavers/channel decoders 350, 355 to provide the first and second data streams which are provided to the selection circuit 325.

The channel decoders included in the first and second deinterleavers/channel decoders 350, 355 can correct some errors in the raw data streams that were introduced, for example, during transmission of the radio signals. Accordingly, the channel decoders can provide a level of error correction for the first and second data streams such that the data bits included in the raw data may not match the data bits included in the data streams provided to the selection circuit 325. Channel decoders and the correction of data by channel decoders are discussed further, for example, in U.S. patent application Ser. No. 09/201,651, filed Nov. 30, 1998, entitled: *Systems and Methods for Receiving a Modulated Signal Containing Encoded and Unencoded Bits Using Multi-Pass Demodulation*, which is commonly assigned the present assignee, the entire disclosure of which is incorporated herein by reference.

First and second error circuits 315, 320 are electrically coupled to the first and second deinterleavers/channel decoders 350, 355. Class 1A bits included in the first and second data streams are provided to first and second CRC error check circuits 370, 375 included in the first and second error circuits 315, 320. The first and second CRC error circuits 370, 375 can provide an indication of whether an acceptable/unacceptable number of errors was detected in the respective data stream. The indications of an acceptable/unacceptable number of errors in the first and second data streams are provided to the selection circuit 325.

The first and second data streams are also provided to first and second reencoder/reinterleaver circuits 360, 365 to provide first and second reconstructed data streams. The first and second reencoder/reinterleaver circuits 360, 365 nearly reverse the processing provided by the first and second deinterleavers/channel decoders 350, 355. It will be understood that some of the error correction provided by the channel decoders discussed above may not be reversed exactly so that the reconstructed data may not match the raw data.

The first and second reconstructed data streams can be provided to first and second comparison circuits 380, 385 included in the first and second errors circuits 315, 320. The first and second comparison circuits 380, 385 can compare the raw data streams to the reconstructed data streams to provide an indication of how many of the bits in the first and second raw data streams were in error. In some embodiments, the first and second comparison circuits 380, 385 can be used to determine which of the data bits in a frame were in error. The number of bits in error and which bits were in error in each of the data streams can be provided to the selection circuit 325.

The first and second comparison circuits 380, 385 can be first and second bit error rate circuits 315, 320. The bit error rate circuits can determine the rate at which errors occurred as a fraction of some unit of data or time. For example, the bit error rate can be expressed as N errors/second or N errors/MB. Bit error rate calculations are well known in the art and need not be discussed further herein.

According to embodiments of the present invention, the error level provided by the error circuits can use more than the Class 1A bits which may provide an improved indication as to which demodulator would provide better performance. For example, the data bits provided to the first and second comparison circuits 380, 385 can include the Class 1B bits in the frame as defined by IS 136. By selecting the data stream using the Class 1B bits, the selected data stream may also include the Class 2 bits that have fewer errors.

The selection circuit 325 can use the error levels provided by the first and second error circuits 315, 320, such as the acceptability/unacceptability of the number of errors and/or the number of bits in error, to select the demodulator 305, 310 having the better error performance. The selection circuit 325 can select the demodulator by selecting the data stream provided by the demodulator having the better error performance for further processing.

If the error levels indicate that one of CRC checks associated with one of the data streams is acceptable and the other is unacceptable, the selection circuit 325 will select the data stream having the acceptable CRC check. If both CRC checks are acceptable or neither are acceptable, the selection circuit 325 can select the data stream having the lower associated bit error rate. The selection circuit 325 can save the selected data stream as the "previously" selected data stream. If the bit error rates associated with both data streams are about equal, the selection circuit 325 can select the data stream that was selected from the previous frame. The selected data stream can be provided to an audio decoder 390 which provides decoded data to a digital-to-analog converter 395 which is electrically coupled to a speaker 396 that produces audio signals.

In some embodiments according to the present invention, the first and second demodulators can demodulate the radio signals concurrently periodically. For example, in some embodiments according to the present invention, the first and second demodulators can demodulate the radio signals concurrently to determine which demodulator provides the better error performance after which the demodulator that was not selected can stop demodulating the radio signals concurrently with the selected demodulator. In some embodiments according to the present invention, the demodulator that was not selected for N consecutive previous frames can stop demodulating the radio signals concurrently with the selected demodulator.

After a period, the unselected demodulator can be activated to demodulate the radio signals concurrently with the selected demodulator. The unselected demodulator can also be reactivated in response to other occurrences, such as in response to an increased error level associated with the selected demodulator.

Figure 4:
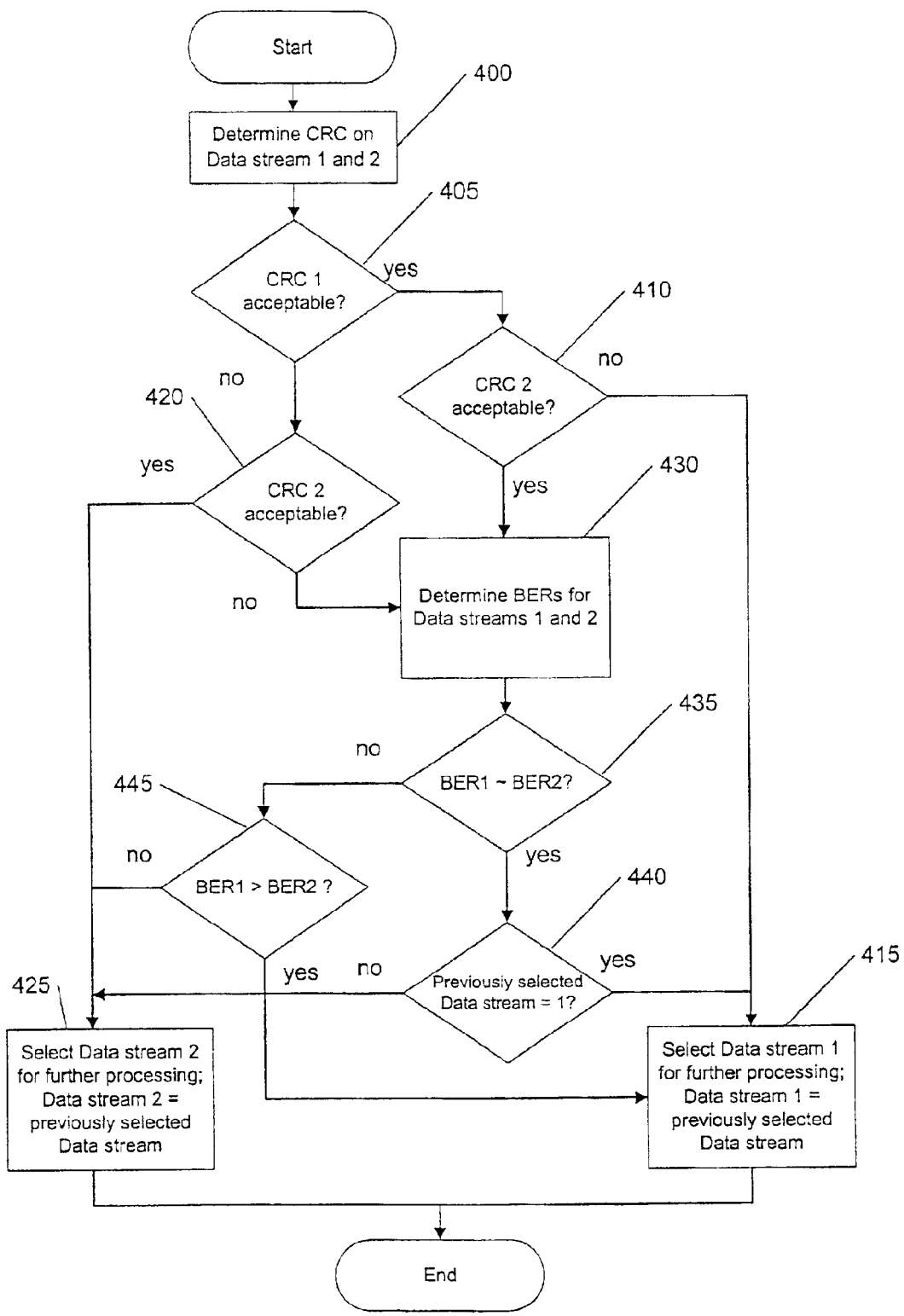
FIG. 4 is a flowchart that illustrates embodiments of methods, wireless radio receivers, and systems according to the present invention.

FIG. 4 is a flow chart that illustrates methods of operating wireless radio receivers according to the present invention. According to FIG. 4, CRC checks for the first and second data streams are determined (block 400). If the CRC check on the first data stream indicates an acceptable error level (block 405) and the CRC check on the second data stream indicates an unacceptable error level (block 410), the first data stream is selected for further processing and is designated as the previously selected data stream (block 415). If the CRC check on the first data stream an indicates unacceptable error level (block 405) and a check on the second data stream indicates an acceptable error level (block 420), the second data stream is selected for further processing and is designated as the previously selected data stream (block 425).

If the CRC check on the first data stream indicates an acceptable error level (block 405) and the CRC check on the second data stream also indicates an acceptable error level (block 410), or if neither CRC check indicates an acceptable error level (blocks 405, 420), the raw bit error rates for the re-encoded first and second data streams (block 430) can be used to select the data stream. If the bit error rates for the first and second data streams are about equal (block 435), the previously selected data stream can be selected for further processing and the selected data stream is designated as the previously selected data stream (block 440).

If the bit error rate associated with the first data stream is greater than the bit error rate associated with the second data stream (block 445), the second data stream can be selected for further processing and the second data stream can be designated as the previously selected data stream (block 425). On the other hand, if the bit error rate associated with the first data stream is less than the bit error rate associated with the second data stream (block 445), the first data stream can be selected for further processing and the first data stream can be designated as the previously selected data stream (block 415).

In some embodiments according to the present invention, the first data stream can be selected if the first error level is acceptable and the second error level is unacceptable. The second data stream can be selected if the second error level is acceptable and the first error level is unacceptable.

In some embodiments according to the present invention, a first error rate associated with the first data stream can be compared to a second error rate associated with the second data stream if the first and second error levels are acceptable. In some embodiments according to the present invention, the first data stream can be selected if the first error rate is less than the second error rate and the second data stream can be selected if the second error rate is less than the first error rate. In some embodiments according to the present invention, one of the first and second data streams can be a previously selected data stream. The previously selected data stream can be selected if the first and second error rates are about equal.

In some embodiments according to the present invention, a first Cyclic Redundancy Code (CRC) check associated with the first data stream can be determined using Class 1A bits received in a frame of a TDMA channel that carries the radio signals. A second CRC check associated with the second data stream can be determined using the Class 1A bits. In some embodiments according to the present invention, the error rates can be determined using at least the Class 1B bits received in a frame of a TDMA channel that carries the radio signals.

In some embodiments according to the present invention, the second data stream overlaps the first data stream in time. In some embodiments according to the present invention, an end portion of the second data stream overlaps a starting portion of the first data stream in time. In some embodiments according to the present invention, at least one frame of the second data stream is substantially aligned in time with at least one frame of the first data stream.

In the drawings and specification, there have been disclosed typical embodiments of the invention and, although specific terms are employed, they are used in a generic and descriptive sense only and not for purposes of limitation, the scope of the invention being set forth in the following claims.

What is claimed:

1. A method for selecting demodulated radio signals comprising:

demodulating radio signals to provide a first data stream;

demodulating the radio signals concurrently to provide a second data stream;

determining a first error level associated with the first data stream that indicates the acceptability of the first data stream for further processing;

determining a second error level associated with the second data stream that indicates the acceptability of the second data stream for further processing; and comparing a first error rate associated with the first data stream to a second error rate associated with the second data stream if the first and second error levels are acceptable.

2. The method of claim 1, wherein the method further comprises:

selecting the first data stream if the first error level is acceptable and the second error level is unacceptable; and selecting the second data stream if the second error level is acceptable and the first error level is unacceptable.

3. The method of claim 1, wherein the method further comprises:

selecting the first data stream if the first error rate is less than the second error rate; and selecting the second data stream if the second error rate is less than the first error rate.

4. The method of claim 1, wherein one of the first and second data streams comprises a previously selected data steam, wherein the method further comprises selecting the previously selected data stream if the first and second error rates are about equal.

5. The method of claim 1, wherein determining the first error level associated with the first data stream comprises determining a first Cyclic Redundancy Code (CRC) check associated with the first data stream using Class 1A bits received in a frame of a TDMA channel that carries the radio signals; and wherein determining the second error level associated with the second data stream comprises determining a second CRC check associated with the second data stream using the Class 1A bits.

6. The method of claim 1, wherein comparing the first error rate associated with the first data stream to the second error rate associated with the second data stream if the first and second error levels are acceptable is preceded by:

determining the first error rate using at least Class 1B bits received in a frame of a TDMA channel that carries the radio signals; and determining the second error rate using at least the Class 1B bits.

7. The method of claim 1, wherein demodulating the radio signals concurrently to provide a second data stream comprises demodulating the same radio signals used to provide the first data stream.

8. The method of claim 1, wherein demodulating the radio signals concurrently to provide a second data stream comprises demodulating the radio signals to provide the second data stream so as to overlap the first data stream in time.

9. The method of claim 1, wherein demodulating the radio signals to provide a second data stream concurrently with the first data stream comprises demodulating the radio signals to provide an end portion of the second data stream so as to overlap a starting portion of the first data stream in time.

10. The method of claim 1, wherein demodulating the radio signals to provide a second data stream concurrently with the first data stream comprises demodulating the radio signals to provide at least one frame of the second data stream that is substantially aligned in time with at least one frame of the first data stream.

11. The method of claim 1 further comprising:

determining that one of the first and second data streams has a greater associated error level; and stopping providing the data stream having the greater associated error level.

12. A method for selecting demodulated radio signals comprising:

demodulating radio signals received via a TDMA channel to provide a first data stream;

demodulating the radio signals concurrently to provide a second data stream;

determining a first error level associated with the first data stream and a second error level associated with the second data stream; and determining a first error rate associated with the first data stream using Class 1B bits received in a frame of a TDMA channel that carries the radio signals and a second error rate associated with the second data stream using the Class 1B bits if the first and second error levels are acceptable.

13. The method of claim 12 further comprising:

selecting the first data stream if the first error rate is less than the second error rate; and selecting the second data stream if the second error rate is less than the first error rate.

14. The method of claim 12, wherein one of the first and second data streams comprises a previously selected data stream, wherein the method further comprises:

selecting the previously selected data stream if the first and second error rates are about equal.

15. The method of claim 12 further comprising:

determining that one of the first and second data streams has a greater associated error level; and stopping providing the data stream having the greater associated error level.

16. A wireless radio receiver comprising:

a first demodulator circuit that receives radio signals and is configured to provide a first data stream;

a second demodulator circuit that receives the radio signals and is configured to demodulate the radio signals concurrently with the first demodulator to provide a second data stream with the first data stream;

a first error circuit, electrically coupled to the first demodulator circuit, that is configured to determine a first error level associated with the first data stream that indicates the acceptability of the first data stream for further processing;

a second error circuit, electrically coupled to the second demodulator circuit, that is configured to determine a second error level associated with the second data stream that indicates the acceptability of the second data stream for further processing; and a comparator circuit, electrically coupled to the first and second demodulator circuits, that is configured to compare a first error rate associated with the first data stream to a second error rate associated with the second data stream if the first and second error levels are acceptable.

17. The wireless radio receiver of claim 16 further comprising:

a selection circuit, electrically coupled to the first and second demodulator circuits, that is configured to select the first data stream if the first error level is acceptable and the second error level is unacceptable and that is configured to select the second data stream if the first error level is unacceptable and the second error level is acceptable.

18. The wireless radio receiver of claim 16 further comprising:

a selection circuit, electrically coupled to the first and second demodulator circuits, that is configured to select the first data stream if the first error rate is less than the second error rate and that is configured to select the second data stream if the second error rate is less than the first error rate.

19. The wireless radio receiver of claim 16, wherein the first error circuit comprises a first Cyclic Redundancy Code (CRC) check circuit that is configured to determine the first error level using Class 1A bits received in a frame of a TDMA channel that carries the radio signals; and wherein the second error circuit comprises a second CRC check circuit that is configured to determine the second error level using the Class 1A bits.

20. The wireless radio receiver of claim 16 further comprising:

a first error rate circuit, electrically coupled to the first demodulator circuit, that is configured to provide the first error rate using at least Class 1B bits received in a frame of a TDMA channel that carries the radio signals; and a second error rate circuit, electrically coupled to the second demodulator circuit, that is configured to provide the second error rate using at least the Class 1B bits.

21. The wireless radio receiver of claim 16, wherein the wireless radio receiver comprises a wireless radiotelephone.

22. The wireless radio receiver of claim 16, wherein the wireless radio receiver comprises a wireless base station.

23. The wireless radio receiver of claim 16, wherein the same radio signals are demodulated to provide the first and second data streams.

24. The wireless radio receiver of claim 16, wherein the second data stream overlaps the first data stream in time.

25. The wireless radio receiver of claim 16, wherein an end portion of the second data stream overlaps a starting portion of the first data stream in time.

26. The wireless radio receiver of claim 16, wherein at least one frame of the second data stream is substantially aligned in time with at least one frame of the first data stream.

27. A wireless radio receiver comprising:

a first demodulator circuit that receives radio signals and that is configured to provide a first data stream;

a second demodulator circuit that receives the radio signals and that is configured to demodulate the radio signals concurrently with the first demodulator to provide a second data stream;

a first error level circuit, electrically coupled to the first demodulator circuit, that is configured to determine a first error level associated with the first data stream using Class 1A bits received in a frame of a TDMA channel;

a second error level circuit, electrically coupled to the second demodulator circuit that is configured to determine a second error level associated with the second data stream using the Class 1A bits;

a first error rate circuit, electrically coupled to the first demodulator circuit, that is configured to provide a first error rate associated with the first data stream using at least Class 1B bits received via in the frame of the TDMA channel; and a second error rate circuit, electrically coupled to the second demodulator circuit, that is configured to provide a second error rate associated with the second data stream using at least the Class 1B bits.

28. The wireless radio receiver of claim 27, wherein the first and second error levels are determined to be acceptable, the wireless radio receiver further comprises:

a selection circuit, electrically coupled to the first and second demodulator circuits, that is configured to select the first data stream if the first error rate is less than the second error rate and that is configured to select the second data stream if the second error rate is less than the first error rate.

29. The wireless radio receiver of claim 28, wherein one of the first and second data streams comprises a previously selected data stream; and wherein the selection circuit is configured to select the previously selected data stream if the first and second error rates are about equal.

30. The wireless radio receiver of claim 27, wherein the same radio signals are demodulated to provide the first and second data streams.

31. The wireless radio receiver of claim 27, wherein the second data stream overlaps the first data stream in time.

32. The wireless radio receiver of claim 27, wherein an end portion of the second data stream overlaps a starting portion of the first data stream in time.

33. The wireless radio receiver of claim 27, wherein at least one frame of the second data stream is substantially aligned in time with at least one frame of the first data stream.

34. A system for selecting demodulated radio signals comprising:

means for demodulating radio signals to provide a first data stream;

demodulating the radio signals concurrently to provide a second data stream;

means for determining a first error level associated with the first data stream that indicates the acceptability of the first data stream for further processing;

means for determining a second error level associated with the second data stream that indicates the acceptability of the second data stream for further processing; and means for comparing a first error rate associated with the first data stream to a second error rate associated with the second data stream if the first and second error levels are acceptable.

35. The system of claim 34, wherein the system further comprises:

means for selecting the first data stream if the first error level is acceptable and the second error level is unacceptable; and means for selecting the second data stream if the second error level is acceptable and the first error level is unacceptable.

36. The system of claim 34, wherein the system further comprises:

means for selecting the first data stream if the first error rate is less than the second error rate; and means for selecting the second data stream if the second error rate is less than the first error rate.

37. The system of claim 34, wherein one of the first and second data streams comprises a previously selected data stream, wherein the system further comprises selecting the previously selected data stream if the first and second error rates are about equal.

38. The system of claim 34, wherein means for determining the first error level associated with the first data stream comprises means for determining a first Cyclic Redundancy Code (CRC) check associated with the first data stream using Class 1A bits received in a frame of a TDMA channel that carries the radio signals; and wherein the means for determining the second error level associated with the second data stream comprises means for determining a second CRC check associated with the second data stream using the Class 1A bits.

* * * * *